United States Patent [19]
Sano et al.

[11] Patent Number: 5,742,473
[45] Date of Patent: Apr. 21, 1998

[54] MONOLITHIC CERAMIC CAPACITOR

[75] Inventors: Harunobu Sano, Kyoto; Hiroyuki Wada, Shiga-ken; Yukio Hamaji, Otsu, all of Japan

[73] Assignee: Murata Manufacturing Co., Ltd., Japan

[21] Appl. No.: 771,312

[22] Filed: Dec. 20, 1996

[30] Foreign Application Priority Data

Dec. 20, 1995 [JP] Japan .................. 7-349734
Apr. 22, 1996 [JP] Japan .................. 8-126405

[51] Int. Cl.⁶ .............. H01G 4/06; H01G 4/005; H01G 4/228; H01G 2/20
[52] U.S. Cl. .......... 361/321.4; 361/303; 361/305; 361/306.1; 361/306.3; 361/308.1; 361/309; 361/313; 361/321.1; 361/321.4; 361/321.5
[58] Field of Search .............. 361/301.1, 303–305, 361/306.1, 306.3, 308.1, 309, 311–315, 320, 321.1, 321.2, 321.3, 321.4, 321.5, 322; 257/295; 365/145, 149; 29/25.42; 501/134–137

[56] References Cited

U.S. PATENT DOCUMENTS 5,130,281 7/1992 Sano et al. .................. 501/138
5,600,533 2/1997 Sano et al. .................. 361/321.4

Primary Examiner—Bot L. Ledynh
Attorney, Agent, or Firm—Ostrolenk, Faber, Gerb & Soffen, LLP

[57] ABSTRACT

Disclosed is a monolithic ceramic capacitor comprising dielectric ceramic layers made from a material which comprises an essential component of $(1-\alpha-\beta)\{BaO\}_m \cdot TiO_2 + \alpha Re_2O_3 + \beta(Mn_{1-x-y}Ni_xCo_y)O$ ($0.0025 \leq \alpha \leq 0.025$; $0.0025 \leq \beta \leq 0.05$; $\beta/\alpha \leq 4$; $0 \leq x < 1.0$; $0 \leq y < 1.0$; $0 \leq x+y < 1.0$; $1.000 < m \leq 1.035$) and from about 0.5 to 5.0 mols, relative to 100 mols of the essential component, of a side component MgO, and containing from about 0.2 to 3.0 parts by weight, relative to 100 parts by weight of said components, of an oxide of the type of $SiO_2$—$TiO_2$—MO. The capacitor is low-priced and can be small-sized, while having large-capacity. It has a dielectric constant of 3000 or more, and has a high insulation resistance of 6000 MΩ.μF or more and 2000 MΩ.μF or more at room temperature and 125° C., respectively. It has temperature-dependent capacitance that satisfies the B-level characteristic standard stipulated in the JIS Standard and the X7R-level characteristic standard stipulated in the EIA Standard, and has good weather resistance even in high-temperature load and high-humidity load conditions.

16 Claims, 3 Drawing Sheets

MONOLITHIC CERAMIC CAPACITOR

FIELD OF THE INVENTION

The present invention relates to monolithic ceramic capacitors to be used in electronic equipment especially those having inner electrodes made of nickel or nickel alloys.

BACKGROUND OF THE INVENTION

Monolithic ceramic capacitors are generally produced as follows. First, a sheet of a dielectric material with an electrode material which will be an inner electrode coated thereon is prepared. For example, the dielectric material may consist essentially of $BaTiO_3$. Next, a plurality of such sheets each coated with the electrode material are laminated and integrated under heat and pressure, and the resulting laminate is baked in air at from 1250° C. to 1350° C. to obtain a monolithic dielectric ceramic body having inner electrodes therein. Fixed to the both ends of the dielectric ceramic body are outer electrodes that electrically communicate with the inner electrode and the composite is baked. Thus is obtained a monolithic ceramic capacitor.

Accordingly, the materials for such inner electrodes must satisfy the following requirements.

(a) Since the dielectric ceramics and the inner electrodes are baked together, the melting point of the materials for the inner electrodes must be not lower than the temperature at which the dielectric ceramics can be baked.

(b) The materials for the inner electrodes must not be oxidized even in high-temperature, oxidizing atmospheres and must not react with dielectrics.

As electrodes that satisfy these requirements, noble metals such as platinum, gold, palladium and silver-palladium alloys, have heretofore been used. However, these electrode materials are expensive, although having excellent characteristics. The cost of the electrode material can reach from 30 to 70% of the total cost of each monolithic ceramic capacitor, which therefore is an essential factor increasing the production costs of conventional monolithic ceramic capacitors.

In addition to the noble metals, usable are base metals, such as Ni, Fe, Co, W and Mo, which have a high melting point. However, such base metals are easily oxidized in high-temperature, oxidizing atmospheres and lose their ability to function as electrodes. Therefore, if such base metals are used as the inner electrodes in monolithic ceramic capacitors, they must be baked in neutral or reducing atmospheres along with dielectric ceramics. However, conventional dielectric ceramic materials are defective in that if they are baked in such neutral or reducing atmospheres, they are greatly reduced into semiconductors.

In order to overcome these drawbacks, proposed for example, were a dielectric material comprising a solid solution of barium titanate where the ratio of barium sites/titanium sites is in excess of the stoichiometric ratio thereof, such as that disclosed in Japanese Patent Publication No. 57-42588; and a dielectric material comprising a solid solution of barium titanate and containing oxides of rare earth metals, such as La, Nd, Sm, Dy and Y, added thereto, such as that disclosed in Japanese Patent Application Laid-Open No. 61-101459.

Also proposed were a dielectric material having a composition of $BaTiO_3$—$CaZrO_3$—$MnO$—$MgO$, such as that disclosed in Japanese Patent Application No. 62-256422; and a dielectric material having a composition of $BaTiO_3$—$(Mg,Zn,Sr,Ca)O$—$B_2O_3$—$SiO_2$, such as that disclosed in Japanese Patent Publication No. 61-14611.

Using these dielectric materials, dielectric ceramics were obtained which are not converted into semiconductors even when baked in reducing atmospheres. As a result, it has become possible to produce monolithic ceramic capacitors comprising inner electrodes of base metals such as nickel.

With recent developments in electronics, a great demand for small-sized electronic parts has developed, and small-sized, large-capacity, monolithic ceramic capacitors are therefore greatly required. For these reasons, the recent tendency in the art is rapidly toward dielectric materials having a higher dielectric constant and toward thinner dielectric layers. Accordingly, there is now a great demand for dielectric materials with high reliability having a high dielectric constant, in which the temperature-dependent variation is small.

However, the dielectric materials disclosed in Japanese Patent Publication No. 57-42588 and Japanese Patent Application Laid-Open No. 61-101459 are limited in that the crystals of the dielectric ceramics obtainable from the materials are generally large although the dielectric ceramics themselves may have a high dielectric constant, with the result that when thin dielectric layers having a thickness of, for example, 10 μm or less are made of such dielectric ceramics and incorporated into monolithic capacitors, the number of crystals to each layer is reduced and therefore the reliability of the monolithic capacitors is lowered. In addition, the dielectric materials were further limited in that the temperature-dependent variation of the dielectric constant of the dielectric ceramics is great. For these reasons, the conventional dielectric materials could not meet the requirements of the market.

On the other hand, the dielectric material disclosed in Japanese Patent Application Laid-Open No. 62-256422 was limited in that $CaZrO_3$ and also $CaTiO_3$ that are formed during the baking step may often form secondary phases together with Mn and others and therefore the high-temperature reliability of the capacitor comprising the material is problematic, although the dielectric constant of the ceramic body of the material is relatively high, the crystals constituting the ceramic body are small, and the temperature-dependent variation of the dielectric constant is small.

The dielectric material disclosed in Japanese Patent Publication No. 61-14611 was limited in that the dielectric constant of the ceramic body of the material is from 2000 to 2800 and therefore the material is not suitable for small-sized, large-capacity monolithic capacitors. In addition, the material was further defective in that it does not satisfy the X7R-level characteristic standard stipulated in the EIA Standard, which indicates that the temperature-dependent variation in the capacitance within the range between −55° C. and +125° C. shall be ±15%.

Although some improvements were made in the non-reducing dielectric ceramic compositions that have heretofore been proposed in the art to make them have good insulation resistance in high-temperature load life tests, the improvement in their insulation resistance in moisture-resistant load tests was still unsatisfactory as yet.

In order to solve the above-mentioned problems, proposed were different compositions, for example, in Japanese Patent Application Laid-Open Nos. 05-09066, 05-09067 and 05-09068. However, these compositions still could not satisfy the recent severe requirements for small-sized, large-capacity capacitors in the market. Specifically, the requirements for these in the market are to make them have much thinner dielectric layers and have even higher reliability. Therefore, there is still a great demand for dielectric materials capable of producing much thinner dielectric layers in monolithic ceramic capacitors with much higher reliability. Given the situation, accordingly, it has become necessary to provide small-sized, large-capacity, high-reliability monolithic ceramic capacitors which still having highly-reliable characteristics in high-temperature and high-humidity conditions.

SUMMARY OF THE INVENTION

Accordingly, the subject matter of the present invention is to provide a low-priced, small-sized, large-capacity, monolithic ceramic capacitor, which has a dielectric constant of 3000 or more, which has a high insulation resistance when measured at room temperature of 6000 M$\Omega$.μF or more and 125° C. of 2000 M$\Omega$.μF or more, in terms of its product with the capacitance (the product CR), which has temperature-dependent capacitance that satisfies the B-level characteristic standard stipulated in the JIS Standard and the X7R-level characteristic standard stipulated in the EIA Standard, and which has good weather resistance even in high-temperature and high-humidity load conditions.

Specifically, the present invention provides a monolithic ceramic capacitor composed of a plurality of dielectric ceramic layers, a plurality of inner electrodes formed between the dielectric ceramic layers in such a manner that one end of each inner electrode is exposed out of an end of the dielectric ceramic layers, and outer electrodes electrically connected with the exposed inner electrodes, which is characterized in that the dielectric ceramic layers each are made of a material comprising barium titanate having a content of alkali metal oxide impurities of about 0.02% by weight or less, and also terbium oxide, dysprosium oxide, holmium oxide, erbium oxide, ytterbium oxide, manganese oxide, cobalt oxide and nickel oxide, and containing a side component, magnesium oxide in an amount of from about 0.5 to 5.0 mols, in terms of MgO, relative to 100 mols of the essential component having the following compositional formula:

$(1-\alpha-\beta)\{BaO\}_m \cdot TiO_2 + \alpha Re_2O_3 + \beta(Mn_{1-x-y}Ni_xCo_y)O$ where $Re_2O_3$ is one or more selected from $Tb_2O_3$, $Dy_2O_3$, $Ho_2O_3$, $Er_2O_3$ and $Yb_2O_3$; and $\alpha$, $\beta$, m, x and y are as follows:

$0.0025 \leq \alpha \leq 0.025$ $0.0025 \leq \beta \leq 0.05$ $\beta/\alpha \leq 4$ $0 \leq x < 1.0$ $0 \leq y < 1.0$ $0 \leq x+y < 1.0$ $1.000 < m \leq 1.035$, and further containing from about 0.2 to 3.0 parts by weight, relative to 100 parts by weight of said components, of an oxide of the type of $SiO_2$—$TiO_2$—MO (where MO is at least one or more oxides selected from BaO, CaO, SrO, MgO, ZnO and MnO); and the inner electrodes each are made of nickel or a nickel alloy.

It is preferred that the alkali metal oxide impurity content is less that about 0.015% by weight, the magnesium oxide is in an amount of from about 0.5 to 5.0 mols, $0.003 \leq \alpha \leq 0.02$, $0.005 \leq \beta \leq 0.024$, $\beta/\alpha \leq 2$, $0.1 \leq x < 0.9$, $0.1 \leq y < 0.9$, $1.005 < m \leq 1.015$, and the $SiO_2$—$TiO_2$—MO oxide is about 1 to 2 parts by weight.

Preferably, the oxide of the type of $SiO_2$—$TiO_2$—MO (where MO is at least one or more oxides selected from BaO, CaO, SrO, MgO, ZnO and MnO) falls within a compositional range as surrounded by four lines formed by connecting four points, represented by mol %, of:

A (85, 1, 14)

B (35, 51, 14)

C (30, 20, 50)

D (39, 1, 60)

in a triangular diagram of $\{SiO_2, TiO_2, MO\}$; and the oxide further contains at total of about 15 parts by weight or less, relative to 100 parts by weight of said components, of at least one of $Al_2O_3$ and $ZrO_2$ provided that the $ZrO_2$ content is about 5 parts by weight or less.

Also preferably, the outer electrodes each are made of a sintered layer of an electroconductive metal powder or of an electroconductive metal powder with glass frit added thereto. Further preferably, the outer electrodes each are composed of a first, sintered layer of an electroconductive metal powder or of an electroconductive metal powder with glass frit added thereto, and a second, plated layer formed on the first layer.

As the material for the dielectric ceramic layers, herein used is a dielectric ceramic composition comprising barium titanate, and one or more rare earth oxides selected from terbium oxide, dysprosium oxide, holmium oxide, erbium oxide and ytterbium oxide, and also manganese oxide, cobalt oxide and nickel oxide, at a specific compositional ratio, and containing magnesium oxide and an oxide of the type of $SiO_2$—$TiO_2$—MO. Therefore, the dielectric ceramic composition can be baked even in a reducing atmosphere without worsening its characteristics. As a result, it is possible to obtain a high-reliability, monolithic ceramic capacitor having a temperature-dependent capacitance that satisfies the B-level characteristic standard stipulated in the JIS Standard and also the X7R-level characteristic standard stipulated in the EIA Standard, and having high insulation resistance at room temperature and even at high temperatures. In addition, since the crystal grains constituting the sintered ceramic body are small, having grain sizes of about 1 μm or smaller, preferably less than about 0.75 μm, the number of the ceramic crystal grains in each dielectric layer can be increased. Therefore, even when the dielectric layers in the monolithic ceramic capacitor are thinned, the reliability of the capacitor is not lowered.

We, the present inventors have found that, in the dielectric ceramic composition which is to form the dielectric ceramic layers and which comprises barium titanate, and one or more rare earth oxides selected from terbium oxide, dysprosium oxide, holmium oxide, erbium oxide and ytterbium oxide, and also manganese oxide, cobalt oxide and nickel oxide, the content of the impurities in the barium titanate, such as alkaline earth metal oxides, e.g., SrO and CaO; alkali metal oxides, e.g., $Na_2O$ and $K_2O$; and other oxides, e.g., $Al_2O_3$ and $SiO_2$, especially that of alkali metal oxides such as $Na_2O$ and $K_2O$, has a great influence on the electric characteristics of the capacitors. Specifically, if barium titanate having an alkali metal oxide impurity content of smaller than about 0.02% by weight is in the dielectric ceramic composition, the capacitors obtained may have a dielectric constant of 3000 or higher.

In addition, we, the present inventors have also found that the addition of an oxide consisting essentially of $SiO_2$—$TiO_2$—MO (where MO is one or more oxides selected from BaO, CaO, SrO, MgO, ZnO and MnO) to the dielectric ceramic composition improves the sinterability of the composition while also improving the moisture-resistant load characteristics of the capacitors comprising the composition. Moreover, we have further found that the addition of $Al_2O_3$ and $ZrO_2$ to the oxide consisting essentially of $SiO_2$—$TiO_2$—MO increases the insulation resistance of the ceramic layers.

According to the present invention that has the effects mentioned above, therefore, it is possible to realize a high-reliability, small-sized, large-capacity, monolithic ceramic capacitor having inner electrodes of nickel or a nickel alloy, and of which the temperature-dependent variation in the capacitance is small.

In the monolithic ceramic capacitor of the present invention, the dielectric ceramic layers are made from a dielectric ceramic composition that can be baked without being reduced into semiconductors even in a reducing atmosphere. Therefore, a base metal of nickel or a nickel alloy can be used as the material for the electrodes in the capacitor. In addition, since the composition can be baked at relatively low temperatures of about 1300° C. or lower, the production costs of the capacitor can be reduced.

Moreover, the monolithic ceramic capacitor of the invention that comprises ceramic layers made from such dielectric ceramic compositions has a dielectric constant of 3000 or higher, and the temperature-dependent variation in the high dielectric constant of the capacitor is small. Further, the capacitor has high insulation resistance and has good characteristics, and their characteristics are not degraded even in high-temperature and high-humidity conditions. In addition, since the crystals constituting the dielectric layers are small having grain sizes of 1 μm or smaller, the layers can be thinned well, without reducing the number of the crystals to be therein, and this is different from the ceramic layers constituting conventional monolithic ceramic capacitors. Therefore, according to the present invention, it is possible to obtain such a high-reliability, small-sized, large-capacity, monolithic ceramic capacitor.

The above-mentioned objects and other objects of the present invention, and also the characteristics and the advantages thereof will be clarified further more in the detailed description of the preferred modes of carrying out the invention and the examples of the invention, which is made hereinunder with reference to the drawings attached hereto.

PREFERRED MODES OF CARRYING OUT THE INVENTION

Figure 1:
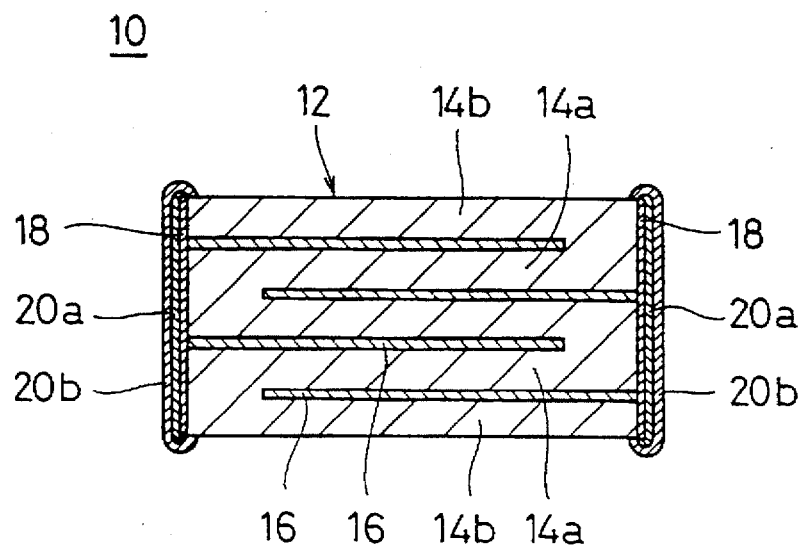
FIG. 1 is a cross-sectional view illustrating one embodiment of the present invention.

FIG. 1 is a cross-sectional view showing one embodiment of the present invention. The monolithic ceramic capacitor 10 illustrated comprises a monolithic dielectric ceramic body 12. The monolithic dielectric ceramic body 12 is formed by integrally laminating a plurality of first dielectric ceramic layers 14a and two second dielectric ceramic layers 14b. In the monolithic dielectric ceramic body 12, the dielectric ceramic layers 14a and 14b are integrally laminated in such a manner that the two dielectric ceramic layers 14b are disposed at both sides, while sandwiching therebetween a plurality of the first dielectric ceramic layers 14a. These dielectric ceramic layers 14a and 14b are laminated with inner electrodes 16 as alternately embedded therein. On each of the sides of the monolithic dielectric ceramic body 12, formed are an outer electrode 18, a first plate film 20a and a second plate film 20b in that order. The first plate film 20a may be made of nickel or copper, and the second plate film 20b may be made of solder or tin. Accordingly, the monolithic ceramic capacitor 10 is shaped in the form of a rectangular parallelepiped chip.

Now, a method for producing the monolithic ceramic capacitor 10 of the invention is described below in the order of the steps constituting the method.

Figure 2:
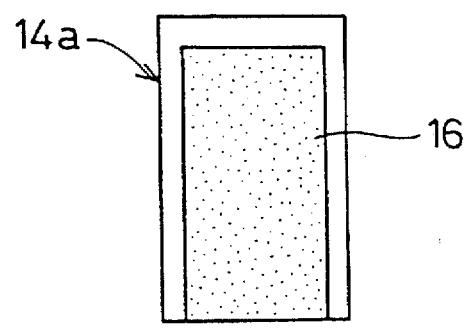
FIG. 2 is a plan view illustrating one embodiment of the first dielectric ceramic layer to be laminated.
Figure 3:
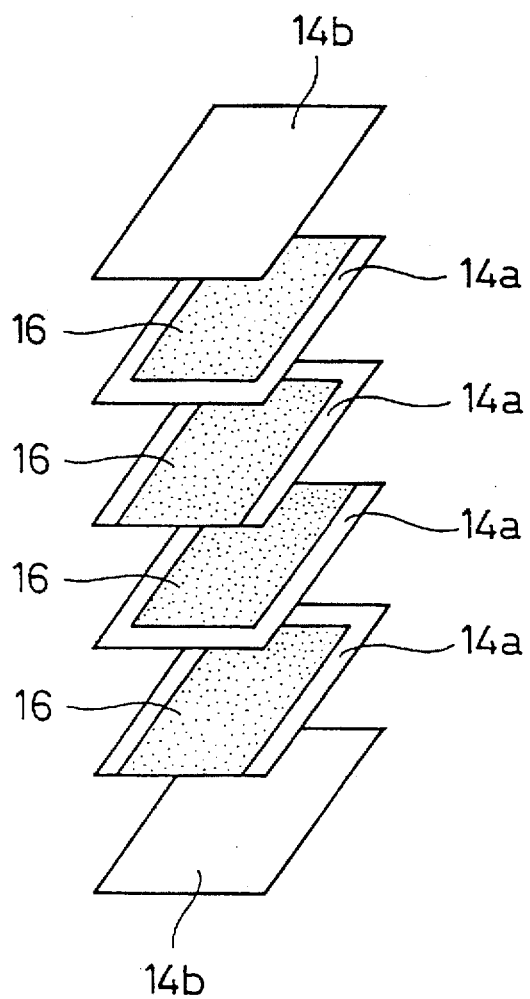
FIG. 3 is a perspective, exploded view illustrating the lamination of first dielectric ceramic layers and second dielectric ceramic layers to construct the monolithic dielectric ceramic body to be in the capacitor of the invention.

First, the monolithic dielectric ceramic body 12 is produced as follows. As in FIG. 2, a raw material powder comprising barium titanate; and one or more rare earth oxides selected from terbium oxide, dysprosium oxide, holmium oxide, erbium oxide and ytterbium oxide; and manganese oxide, cobalt oxide, nickel oxide and magnesium oxide; and an oxide consisting essentially of $SiO_2$—$TiO_2$—MO is formed into a slurry, and then sheeted to prepare a first, dielectric ceramic layer 14a (green sheet). On one surface of the green sheet, formed is an internal electrode 16 of nickel or a nickel alloy. To form the internal electrode 16, employable is any known method of screen printing, metal vapor deposition or plating. A predetermined number of the first dielectric ceramic layers 14a, each with the inner electrode 16 formed thereon, are laminated and then sandwiched between two dielectric ceramic layers 14b with no inner electrode 16, as in FIG. 3, and these are integrated under pressure to give a monolithic laminate. Next, the resulting laminate is baked in a reducing atmosphere at a predetermined temperature to obtain a monolithic dielectric ceramic body 12.

Next, on the both sides of the monolithic dielectric ceramic body 12, formed are two outer electrodes 18 that are connected with the inner electrodes 16. The material of the outer electrodes 18 may be the same as that of the inner electrodes 16. Apart from this, silver, palladium, silver-palladium alloys and others can be used as the material of the outer electrodes 18, to which can be added glass frit, such as glass of the $B_2O_3$—$SiO_2$—BaO type. In consideration of the use of the monolithic ceramic capacitor 10 and the site at which the capacitor 10 is used, suitable materials are selected for the outer electrodes 18. The outer electrodes 18 can be formed by applying a paste material of metal powder onto the baked, monolithic dielectric ceramic body 12 followed by baking. Alternatively, the paste material can be applied onto the non-baked body 12, which is thereafter baked. After this, the outer electrodes 18 may be plated with nickel, copper or the like to form a first plate film 20a thereon. Last, the first plate film 20a is coated with a second plate film 20b of solder, tin or the like. Thus is produced the chip-type, monolithic ceramic capacitor 10 of the invention.

EMBODIMENTS OF THE INVENTION

Example 1

First, raw materials of $TiCl_4$ and $Ba(NO_3)_2$ having various degrees of purity were prepared and weighed. These were treated with oxalic acid to obtain a precipitate of barium titanyl oxalate $(BaTiO(C_2O_4)\cdot 4H_2O)$. This precipitate was decomposed at 1000° C. or higher to obtain four types of barium titanate $(BaTiO_3)$, as shown in Table 4. On the other hand, oxides, carbonates and hydroxides of the constitutive components were weighed to give a composition of $0.66SiO_2$-$0.17TiO_2$-$0.15BaO$-$0.02MnO$ (by mol), then mixed and ground to obtain a powder. This powder was heated at 1500° C. in a platinum crucible, then rapidly cooled and thereafter ground to obtain a oxide powder having a mean grain size of 1 μm or less.

Next, prepared were $BaCO_3$, which is to adjust the molar ratio m of Ba/Ti in the barium titanate, and $Tb_2O_3$, $Dy_2O_3$, $Ho_2O_3$, $Er_2O_3$, $Yb_2O_3$, MnO, NiO, CoO and MgO each having a purity of 99% or more. Powders of these raw materials were mixed with the oxide powder prepared above at various compositional ratios as shown in Table 2 to prepare various compositions. Each composition was wet-milled in a ball mill along with a polyvinyl butyral binder and an organic solvent such as ethanol to obtain a ceramic slurry. This ceramic slurry was sheeted by doctor blading to obtain a rectangular, ceramic green sheet having a thickness of 11 μm. Next, an electroconductive paste consisting essentially of Ni was printed on this ceramic green sheet to form thereon an electroconductive paste layer, which is formed into an inner electrode.

TABLE 2

| | $(1 - \alpha - \beta)(BaO)_m \cdot TiO_2 + \alpha Re_2O_3 + \beta(Mn_{1-x-y}Ni_xCO_y)O$ | | | | | | | | | | | | | Amount of Oxide |
|---|---|---|---|---|---|---|---|---|---|---|---|---|---|---|
| Sample | Type of | | | α | | | | | | | | | | Glass Added |
| No. | $BaTiO_3$ | $Tb_2O_3$ | $Dy_2O_3$ | $Ho_2O_3$ | $Er_2O_3$ | $Yb_2O_3$ | Total | β | x | y | β/α | m | MgO | (wt. pts.) |
| *1  | A | —      | —      | —      | —      | —      | 0.0000 | 0.010  | 0.3 | 0.5  | —   | 1.010 | 1.20 | 0.80 |
| *2  | A | —      | 0.010  | —      | —      | 0.002  | 0.0120 | 0.000  | —   | —    | 0   | 1.010 | 1.20 | 0.80 |
| *3  | A | —      | 0.010  | —      | —      | 0.002  | 0.0120 | 0.010  | 0.3 | 0.5  | 5/6 | 0.990 | 1.20 | 0.80 |
| *4  | A | —      | —      | 0.0120 | —      | —      | 0.0120 | 0.010  | 0.3 | 0.5  | 5/6 | 1.000 | 1.00 | 0.80 |
| *5  | A | 0.0100 | 0.0020 | —      | —      | —      | 0.0120 | 0.0120 | 0.3 | 0.5  | 1   | 1.010 | 0.00 | 0.80 |
| *6  | A | —      | 0.010  | —      | —      | —      | 0.0100 | 0.0100 | 0.3 | 0.5  | 1   | 1.015 | 1.20 | 0.00 |
| 7   | A | 0.0010 | 0.0015 | —      | —      | —      | 0.0025 | 0.0025 | 0.1 | 0.3  | 1   | 1.005 | 0.50 | 0.20 |
| 8   | A | —      | 0.0050 | 0.0050 | —      | —      | 0.0100 | 0.0080 | 0.3 | 0.2  | 4/5 | 1.010 | 1.00 | 1.00 |
| 9   | A | —      | 0.0080 | —      | —      | 0.0040 | 0.0120 | 0.0080 | 0.0 | 0.9  | 2/3 | 1.010 | 3.00 | 1.50 |
| 10  | A | 0.0010 | —      | —      | 0.0080 | —      | 0.0090 | 0.0090 | 0.3 | 0.5  | 1   | 1.015 | 1.20 | 1.00 |
| 11  | A | 0.0040 | —      | 0.0040 | —      | —      | 0.0080 | 0.0080 | 0.9 | 0.0  | 1   | 1.010 | 1.20 | 1.00 |
| 12  | C | —      | 0.015  | —      | 0.0100 | —      | 0.0250 | 0.0500 | 0.6 | 0.3  | 2   | 1.005 | 1.00 | 2.00 |
| 13  | B | —      | —      | 0.0030 | —      | —      | 0.0030 | 0.0060 | 0.3 | 0.4  | 2   | 1.007 | 5.00 | 3.00 |
| 14  | A | —      | —      | —      | 0.010  | —      | 0.0100 | 0.0050 | 0.0 | 0.0  | 1/2 | 1.010 | 1.00 | 1.00 |
| 15  | A | 0.0060 | —      | —      | —      | —      | 0.0060 | 0.0240 | 0.3 | 0.5  | 4   | 1.035 | 0.50 | 2.00 |
| 16  | A | —      | 0.0080 | 0.0120 | —      | —      | 0.0200 | 0.0040 | 0.1 | 0.1  | 1/5 | 1.015 | 2.00 | 1.20 |
| *17 | A | —      | —      | 0.010  | —      | 0.020  | 0.030  | 0.015  | 0.3 | 0.3  | 1/2 | 1.010 | 2.00 | 1.20 |
| *18 | A | —      | 0.010  | 0.010  | —      | —      | 0.020  | 0.080  | 0.3 | 0.3  | 4.0 | 1.010 | 1.20 | 1.00 |
| *19 | A | —      | 0.010  | —      | —      | —      | 0.010  | 0.010  | 1.0 | —    | 1.0 | 1.010 | 1.20 | 0.80 |
| *20 | A | —      | 0.010  | —      | —      | —      | 0.010  | 0.010  | —   | 1.0  | 1.0 | 1.010 | 1.20 | 0.80 |
| *21 | A | 0.0050 | —      | —      | —      | —      | 0.0050 | 0.050  | 0.3 | 0.3  | 10  | 1.010 | 1.20 | 0.80 |
| *22 | A | —      | 0.010  | —      | —      | —      | 0.010  | 0.0050 | 0.3 | 0.03 | 1/2 | 1.050 | 1.20 | 1.50 |
| *23 | A | —      | 0.010  | —      | —      | —      | 0.010  | 0.0050 | 0.3 | 0.3  | 1/2 | 1.010 | 8.0  | 1.50 |
| *24 | A | —      | 0.010  | —      | —      | —      | 0.010  | 0.0050 | 0.3 | 0.3  | 1/2 | 1.010 | 1.20 | 5.00 |
| *25 | D | —      | 0.010  | —      | —      | —      | 0.010  | 0.0050 | 0.3 | 0.3  | 1/2 | 1.010 | 1.20 | 1.00 |

SAMPLES WITH * ARE OUTSIDE THE INVENTION

TABLE 1

| | Content of Impurities (wt %) | | | | | |
|---|---|---|---|---|---|---|
| Type of $BaTiO_3$ | Alkali Metal Oxides | SrO | CaO | $SiO_2$ | $Al_2O_3$ | Mean Grain Size (μm) |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

A plurality of these ceramic green sheets each having the electroconductive paste layer formed thereon were laminated in such a manner that the side of one sheet with the electroconductive paste exposed out of it was alternated with that of another sheet with the electroconductive paste not exposed out of it. Thus was obtained a laminate. This laminate was heated in an $N_2$ atmosphere at 350° C. whereby the binder was burnt out, and then baked for 2 hours in a reducing atmosphere comprising gases of $H_2$, $N_2$ and $H_2O$ and having an oxygen partial pressure of from $10^{-12}$ to $10^{-9}$ MPa, at various temperatures shown in Table 3, to obtain sintered ceramic bodies.

TABLE 3

| Sample No. | Baking Temperature (°C.) | Dielectric Constant, $\epsilon$ | Dielectric Loss, tan $\delta$ (%) | Temperature-Dependent Variation in Capacitance, $\Delta C/C_{20}$ | | Temperature-Dependent Variation in Capacitance $\Delta C/C_{25}$ | | | Product CR (M$\Omega \cdot \mu$F), at 25° C. 16 V | Product CR (M$\Omega \cdot \mu$F), at 125° C. 16 V | Mean Life Time (hr.) | Number of Test Pieces Failed In Moisture-Resistant Load Test | Grain Size ($\mu$m) |
|---|---|---|---|---|---|---|---|---|---|---|---|---|---|
| | | | | −25° C. | 85° C. | −55° | 125° C. | max | | | | | |
| *1 | 1300 | 2810 | 2.5 | −11.8 | −3.2 | −16.1 | 5.6 | 16.1 | 8050 | 1820 | 8 | 0/72 | 0.82 |
| *2 | 1280 | As semiconductors were formed, the measurement was impossible | | | | | | | | | | | 2.5 |
| *3 | 1280 | As semiconductors were formed, the measurement was impossible | | | | | | | | | | | 2.0 |
| *4 | 1280 | 3370 | 2.0 | −2.8 | −5.3 | −3.1 | −5.5 | 5.6 | 3970 | 600 | 111 | 0/72 | 0.74 |
| *5 | 1280 | 3330 | 1.9 | −0.1 | −10.3 | −0.5 | −16.4 | 16.4 | 5200 | 1770 | 305 | 0/72 | 0.73 |
| *6 | 1360 | As the sample was sintered insufficiently, the measurement was impossible | | | | | | | | | | | 0.61 |
| 7 | 1300 | 4060 | 2.5 | −6.6 | −6.8 | −10.1 | −12.7 | 12.7 | 7270 | 4590 | 320 | 0/72 | 0.72 |
| 8 | 1280 | 3400 | 2.0 | −2.2 | −5.7 | −2.4 | −7.0 | 7.3 | 6520 | 2440 | 555 | 0/72 | 0.69 |
| 9 | 1300 | 3080 | 1.8 | −2.0 | −5.3 | −2.1 | −6.4 | 6.4 | 6130 | 2280 | 581 | 0/72 | 0.69 |
| 10 | 1280 | 3450 | 2.0 | −1.5 | −6.8 | −0.7 | −9.8 | 10.2 | 6770 | 2500 | 512 | 0/72 | 0.70 |
| 11 | 1280 | 3520 | 2.1 | −1.9 | −7.3 | −1.3 | −8.5 | 11.0 | 6540 | 2180 | 505 | 0/72 | 0.72 |
| 12 | 1280 | 3020 | 1.6 | −2.1 | −5.0 | −1.6 | −5.3 | 5.4 | 6010 | 2090 | 597 | 0/72 | 0.78 |
| 13 | 1260 | 3290 | 1.9 | −4.2 | −6.9 | −5.5 | −11.1 | 11.1 | 7140 | 3880 | 321 | 0/72 | 0.63 |
| 14 | 1280 | 3280 | 1.9 | −1.1 | −5.6 | −2.1 | −5.8 | 5.8 | 6060 | 2090 | 341 | 0/72 | 0.69 |
| 15 | 1300 | 3360 | 1.9 | −1.2 | −8.4 | −3.0 | −11.8 | 11.9 | 6930 | 2520 | 333 | 0/72 | 0.68 |
| 16 | 1300 | 3090 | 1.6 | −1.5 | −3.9 | −2.8 | −2.3 | 4.1 | 6010 | 2030 | 657 | 0/72 | 0.68 |
| *17 | 1360 | 2250 | 1.9 | −2.2 | −2.1 | −3.8 | −0.8 | 3.8 | 3720 | 1020 | 198 | 8/72 | 0.65 |
| *18 | 1280 | 3060 | 1.9 | −0.3 | −9.5 | −0.1 | −15.8 | 15.8 | 5580 | 530 | 63 | 0/72 | 0.70 |
| *19 | 1300 | 3420 | 2.1 | −1.6 | −6.2 | −2.5 | −7.0 | 7.0 | 2540 | 250 | 131 | 0/72 | 0.71 |
| *20 | 1300 | 3290 | 1.8 | −2.1 | −5.2 | −3.0 | −5.9 | 6.3 | 3340 | 310 | 164 | 0/72 | 0.71 |
| *21 | 1300 | 3580 | 2.2 | 0.8 | −10.7 | 0.2 | −17.6 | 17.6 | 6670 | 1510 | 210 | 0/72 | 0.72 |
| *22 | 1360 | As the sample was sintered insufficiently, the measurement was impossible | | | | | | | | | | | 0.61 |
| *23 | 1360 | 2320 | 1.6 | −1.2 | −3.5 | −2.5 | 2.5 | 4.1 | 6150 | 2130 | 385 | 40/72 | 0.66 |
| *24 | 1200 | 1900 | 1.2 | −0.8 | −2.9 | −1.8 | 3.1 | 3.5 | 3850 | 2580 | 421 | 0/72 | 0.69 |
| *25 | 1280 | 2670 | 1.8 | −2.5 | −4.8 | −4.3 | −5.7 | 5.9 | 6300 | 2420 | 533 | 0/72 | 0.65 |

Samples with * are outisde the invention

The surface of each sintered ceramic body was observed with a scanning electronic microscope at a magnification of 1500 times to determine the grain sizes of the grains seen in the field of view.

A silver paste containing glass frit of the $B_2O_3$—$Li_2O$—$SiO_2$—BaO type was applied onto the both sides of each sintered ceramic body, and baked again in an $N_2$ atmosphere at 600° C. to thereby form outer electrodes electrically connected with the inner electrodes.

The outer dimension of each of these monolithic capacitors thus obtained was 1.6 mm width×3.2 mm length×1.2 mm thickness, and the thickness of each dielectric ceramic layer as sandwiched between the inner electrodes was 8 μm. The total number of the effective dielectric ceramic layers was 19, and the area of the facing electrodes per one ceramic layer was 2.1 mm².

The electric characteristics of these capacitor samples produced herein were measured. Precisely, the capacitance (C) and the dielectric loss (tan δ) were measured, using an automatic bridge-type meter at a frequency of 1 KHz, at 1 V rms and at 25° C. From the capacitance thus measured, obtained was the dielectric constant ($\epsilon$) of each sample through calculation. Next, to measure the insulation resistance (R) of each sample, a direct current voltage of 16 V was applied to each sample at 25° C. or 125° C. for 2 minutes using an insulation resistance meter. After having thus measured the insulation resistance (R) of each sample, the product of the capacitance (C) and the insulation resistance (R) or, that is, the product CR of each sample was obtained. In addition, the temperature-dependent variation in the capacitance of each sample was determined.

For the temperature-dependent variation in the capacitance, obtained were the variation in the capacitance between −25° C. and 85° C. based on the capacitance at 20° C. ($\Delta C/C_{20}$), the variation in the capacitance between −55° C. and 125° C. based on the capacitance at 25° C. ($\Delta C/C_{25}$), and the maximum variation, in terms of the absolute value, between −55° C. and 125° C. (|$\Delta C$|max).

To determine the high-temperature load life of each sample, 36 pieces of each sample were subjected to a high-temperature load test in which a direct current voltage of 100 V was applied to each piece at 150° C., while measuring the insulation resistance of each test piece which varied time-dependently. In this test, the period of time within which the insulation resistance value (R) of each piece being tested reached $10^6 \Omega$ or lower was measured, which is considered the life time of each test piece. The average of all the tested pieces was calculated to obtain the average life time of each sample. In addition, to measure the moisture-resistant load life of each sample, 72 pieces of each sample were subjected to a high-humidity load test in which a direct current voltage of 16 V was applied to each piece at 121° C. under 2 atmospheres (relative humidity: 100%) while measuring the insulation resistance of each test piece which varied time-dependently. In this test, the number of the test pieces that had an insulation resistance value (R) of $10^6 \Omega$ or lower within a period of 250 hours was counted.

The results obtained in these tests are shown in Table 3.

As is obvious from Table 1, Table 2 and Table 3, the monolithic capacitor samples falling within the scope of the present invention were all found to have a high dielectric constant of not lower than 3,000, and have a dielectric loss tangent, tan δ, of not larger than 2.5%, while satisfying the B-level characteristic standard stipulated in the JIS Standard within the temperature range between −25° C. and 85° C. and also the X7R-level characteristic standard stipulated in the EIA Standard within the temperature range between −55° C. and 125° C. with respect to the temperature-dependent variation in the capacitance.

Moreover, these samples of the invention were found to have high insulation resistance values when measured at 25° C. and 125° C., of not smaller than 6,000 Ω.F and not smaller than 2,000 Ω.F, respectively, in terms of the product CR. Further, these were found to have a long mean life time of not shorter than 300 hours, and none of these failed in the moisture-resistant load test. In addition, these were sintered at relatively low temperatures of not higher than 1300° C., and the crystal grains in the sintered samples had grain sizes of not larger than 1 μm.

The reasons for defining the compositions for use in the present invention are mentioned below.

First referred to are the reasons for defining the composition of $(1-\alpha-\beta)\{BaO\}_m \cdot TiO_2 + \alpha Re_2O_3 + \beta(Mn_{1-x-y}Ni_xCo_y)O$, in which $Re_2O_3$ is one or more selected from $Tb_2O_3$, $Dy_2O_3$, $Ho_2O_3$, $Er_2O_3$ and $Yb_2O_3$.

As seen in Sample No. 1, if the amount α of $Re_2O_3$ is smaller than about 0.0025, such is unfavorable since the dielectric constant, ε, is lower than 3,000, the temperature-dependent variation in the capacitance is great, the insulation resistance at 125° C. is low and the mean life time is very short. As noted in Sample No. 17, if the amount α of $Re_2O_3$ is larger than about 0.025, such is also unfavorable since the dielectric constant is not larger than 3,000, the insulation resistance at 25° C. and 125° C. is low, the mean life time is short, some test pieces failed in the moisture-resistant load test, and the sintering temperature is high.

When the amount β of (Mn,Ni,Co)O is smaller than about 0.0025, as in Sample No. 2 such is unfavorable since the constitutive ceramics were reduced into semiconductors when baked in the reducing atmosphere, to thereby lower the insulation resistance. As shown in Sample No. 18, if the amount β of (Mn,Ni,Co)O is larger than about 0.05, such is also unfavorable since the insulation resistance at 25° C. and at 125° C. is lower than 6,000 MΩ.μF and 2,000 MΩ.μF, respectively, the mean life time is shorter than 300 hours, and the temperature-dependent variation in the capacitance is too large to satisfy the X7R-level characteristic standard of the EIA Standard.

As seen in Sample No. 19 and Sample No. 20, if the amount of NiO, x, and the amount of CoO, y, are about 1.0, the insulation resistance at 25° C. and at 125° C. is lower than 6,000 MΩ.μF and 2,000 MΩ.μF, respectively, and the mean life time is shorter than 300 hours.

As noted in Sample No. 21, if the ratio, β/α, of the amount β of (Mn,Ni,Co)O to the amount α of $Re_2O_3$ is larger than about 4, such is unfavorable since the temperature-dependent variation in the capacitance is large, the insulation resistance at 125° C. is lower than 2000 MΩ.μF, and the mean life time is shorter than 300 hours.

When the molar ratio, m, of barium titanate is not larger than about 1.000, as in Sample Nos. 3 and 4, such is unfavorable since the ceramics were converted into semiconductors when baked in the reducing atmosphere to lower the insulation resistance of the capacitor, and the mean life time is short. For these reasons, the dielectric layers constituting the samples cannot be thinned. As seen in Sample No. 22, when the molar ratio m is larger than about 1.035, such is also unfavorable since the sinterability of the sample is very poor.

As illustrated in Sample No. 5, if the amount of MgO is smaller than about 0.5 mols, such is unfavorable since the insulation resistance is low, and the temperature-dependent variation in the capacitance could satisfy neither the X7R-level characteristic standard of the EIA standard nor the B-level characteristic standard of the JIS Standard. As seen in Sample No. 23, if the amount of MgO is larger than about 5.0 mols, such is also unfavorable since the sintering temperature iss too high, the dielectric constant could not be over 3,000, and many test pieces of the sample failed in the moisture-resistant load test.

As shown in Sample No. 6, if the amount of the oxide of the type of $SiO_2$—$TiO_2$—MO is smaller than about 0.2 parts by weight, such is unfavorable since the capacitor could not be sintered sufficiently. As seen in Sample No. 24, if the amount of the oxide of the type of $SiO_2$—$TiO_2$—MO is larger than about 3.0 parts by weight, such is also unfavorable since the dielectric constant was not over 3000, and the insulation resistance at 25° C. was not over 6,000 MΩ.μF.

As illustrated in Sample No. 25, if the content of alkali metal oxide impurities in barium titanate is larger than about 0.02% by weight, such is unfavorable since such impurities lower the dielectric constant.

Example 2

Using barium titanate A in Table 1, prepared was a raw material powder to give a dielectric composition of $98.0\{BaO\}_{1.010}TiO_2 + 0.5Er_2O_3 + 1.0(Mn_{0.3}Ni_{0.7})O$ (by mol) containing 1.0 mol of MgO. To this was added oxide samples of $SiO_2$—$TiO_2$—MO having a mean grain size of 1 μm or less, which had been prepared in the same manner as in Example 1 with heating at from 1200° C. to 1500° C. and shown in Table 4. Using these, prepared were monolithic ceramic capacitors each having outer electrodes of silver electrically connected with inner electrodes, in the same manner as in Example 1. The outer dimension of the monolithic ceramic capacitor samples produced herein was the same as those in Example 1.

TABLE 4

| Sample No. | Amount of Oxide Glass Added (wt. %) | Components of Oxide Glass | | | | | | | | | Additive Components (wt. pts.) | |
|---|---|---|---|---|---|---|---|---|---|---|---|---|
| | | Essential Components (mol %) | | | | | | | | | | |
| | | | | | | MO | | | | | | |
| | | $SiO_2$ | $TiO_2$ | BaO | CaO | SrO | MgO | ZnO | MnO | Total | $AL_2O_3$ | $ZrO_2$ |
| 101 | 1.0 | 85 | 1 | 1 | — | — | — | 4 | 9 | 14 | — | — |
| 102 | 1.0 | 35 | 51 | — | 10 | — | — | — | 4 | 14 | — | — |
| 103 | 1.0 | 30 | 20 | — | 30 | — | 15 | 4 | 1 | 50 | — | — |
| 104 | 1.0 | 39 | 1 | 20 | 20 | 2 | — | 13 | 5 | 60 | — | — |
| 105 | 1.0 | 70 | 10 | 5 | 5 | — | — | 10 | — | 20 | — | — |

TABLE 4-continued

| | | Components of Oxide Glass | | | | | | | | | | |
|---|---|---|---|---|---|---|---|---|---|---|---|---|
| | Amount of Oxide | Essential Components (mol %) | | | | | | | | | Additive Components (wt. pts.) | |
| Sample | Glass Added | | | | | MO | | | | | | |
| No. | (wt. %) | SiO$_2$ | TiO$_2$ | BaO | CaO | SrO | MgO | ZnO | MnO | Total | AL$_2$O$_3$ | ZrO$_2$ |
| 106 | 1.0 | 45 | 10 | — | — | — | — | 15 | 30 | 45 | — | — |
| 107 | 1.0 | 50 | 20 | 10 | 10 | 3 | 7 | — | — | 30 | — | — |
| 108 | 1.0 | 50 | 30 | — | 16 | — | — | — | 4 | 20 | — | — |
| 109 | 1.0 | 35 | 30 | 25 | 10 | — | — | — | — | 35 | — | — |
| 110 | 1.0 | 40 | 40 | 10 | — | — | — | 5 | 5 | 20 | — | — |
| 111 | 1.0 | 45 | 22 | 3 | 30 | — | — | — | — | 33 | 15 | — |
| 112 | 1.0 | 45 | 22 | 3 | 30 | — | — | — | — | 33 | 10 | 5 |
| *113 | 1.0 | 65 | 25 | 5 | 5 | — | — | — | — | 10 | — | — |
| *114 | 1.0 | 25 | 40 | 15 | — | 10 | — | 5 | 5 | 35 | — | — |
| *115 | 1.0 | 30 | 10 | 30 | 25 | — | — | 5 | — | 60 | — | — |
| *116 | 1.0 | 50 | 0 | 35 | 15 | — | — | — | — | 50 | — | — |
| *117 | 1.0 | 45 | 22 | 30 | — | — | 3 | — | — | 33 | 25 | — |
| *118 | 1.0 | 45 | 22 | 30 | — | 3 | — | — | — | 33 | — | 15 |
| *119 | 1.0 | 30 | 60 | 10 | — | — | — | — | — | 10 | — | — |

Samples with * are outisde the invention

The electric characteristics of these samples were measured. The capacitance (C) and the dielectric loss (tan δ) were measured using an automatic bridge-type meter at a frequency of 1 KHz, at 1 V rms and at 25° C. From the capacitance thus measured, obtained was the dielectric constant (e) of each sample through calculation. Next, to measure the insulation resistance (R) of each sample, a direct current voltage of 16 V was applied to each sample at 25° C. or 125° C. for 2 minutes using an insulation resistance meter. After having thus measured the insulation resistance (R) of each sample, the product of the capacitance (C) and the insulation resistance (R) or, that is, the product CR of each sample was obtained. In addition, the temperature-dependent variation in the capacitance of each sample was determined.

For the temperature-dependent variation in the capacitance, obtained were the variation in the capacitance between −25° C. and 85° C. based on the capacitance at 20° C. (ΔC/C$_{20}$), the variation in the capacitance between −55° C. and 125° C. based on the capacitance at 25° C. (ΔC/C$_{25}$), and the maximum variation, in terms of the absolute value, between −55° C. and 125° C. (|ΔC|max).

To determine the high-temperature load life of each sample, 36 pieces of each sample were subjected to a high-temperature load test in which a direct current voltage of 100 V was applied to each piece at 150° C. while measuring the insulation resistance of each test piece which varied time-dependently. In this test, the period of time within which the insulation resistance value (R) of each piece being tested reached 10$^6$ Ω or lower was measured, is considered to be the life time of each test piece. The average of all the tested pieces was calculated to obtain the average life time of each sample. In addition, to measure the moisture-resistant load life of each sample, 72 pieces of each sample were subjected to a high-humidity load test in which a direct current voltage of 16 V was applied to each piece at 121° C. under 2 atmospheres (relative humidity: 100%) while measuring the insulation resistance of each test piece which varied time-dependently. In this test, the number of the test pieces that had an insulation resistance value (R) of 10$^6$ Ω or lower within a period of 250 hours was counted.

The results obtained in these tests are shown in Table 5.

TABLE 5

| Sample No. | Baking Temperature (°C.) | Dielectric Constant ε | Dielectric Loss, tan δ (%) | Temperature-Dependent Variation in Capacitance, ΔC/C$_{20}$ (%) | | Temperature-Dependent Variation in Capacitance ΔC/C$_{25}$ (%) | | | Product CR (MΩ · μF), at 25° C. 16 V | Product CR (MΩ · μF), at 125° C. 16 V | Mean Life Time (hr.) | Number of Test Pieces Failed in Moisture-Resistant Load Test | Grain Size (μm) |
|---|---|---|---|---|---|---|---|---|---|---|---|---|---|
| | | | | −25° C. | 85° C. | −55° C. | 125° C. | max | | | | | |
| 101 | 1300 | 3120 | 1.9 | −1.0 | −7.3 | −2.1 | −8.1 | 8.1 | 6260 | 2290 | 402 | 0/72 | 0.70 |
| 102 | 1300 | 3260 | 2.0 | −1.2 | −6.9 | −1.9 | −7.5 | 7.5 | 6080 | 2100 | 385 | 0/72 | 0.71 |
| 103 | 1300 | 3220 | 1.8 | −0.8 | −7.9 | −0.5 | −9.8 | 10.2 | 6780 | 2640 | 412 | 0/72 | 0.70 |
| 104 | 1300 | 3200 | 1.8 | −1.6 | −6.2 | −2.0 | −6.9 | 7.0 | 6480 | 2430 | 432 | 0/72 | 0.70 |
| 105 | 1280 | 3150 | 1.9 | −1.1 | −7.4 | −1.8 | −7.9 | 7.9 | 6350 | 2320 | 402 | 0/72 | 0.71 |
| 106 | 1280 | 3240 | 1.8 | −1.4 | −6.3 | −1.8 | −7.1 | 7.1 | 6380 | 2460 | 377 | 0/72 | 0.71 |
| 107 | 1300 | 3230 | 1.7 | −1.4 | −7.8 | −1.8 | −8.7 | 8.7 | 6240 | 2260 | 407 | 0/72 | 0.70 |
| 108 | 1280 | 3110 | 1.5 | −0.5 | −8.4 | −0.3 | −10.3 | 10.3 | 6690 | 2520 | 445 | 0/72 | 0.71 |
| 109 | 1280 | 3370 | 2.0 | −1.4 | −6.8 | −2.0 | −6.9 | 7.2 | 6320 | 2390 | 516 | 0/72 | 0.71 |
| 110 | 1280 | 3270 | 1.9 | −0.4 | −9.1 | −0.2 | −11.0 | 11.0 | 6040 | 2100 | 353 | 0/72 | 0.72 |
| 111 | 1300 | 3080 | 1.8 | −0.8 | −7.7 | −1.5 | −8.5 | 8.6 | 7840 | 3380 | 622 | 0/72 | 0.70 |
| 112 | 1300 | 3040 | 1.8 | −0.6 | −8.2 | −1.0 | −12.4 | 12.5 | 7280 | 3270 | 608 | 0/72 | 0.70 |

TABLE 5-continued

| Sample No. | Baking Temperature (°C.) | Dielectric Constant ε | Dielectric Loss, tan δ (%) | Temperature-Dependent Variation in Capacitance, ΔC/C₂₀ (%) -25° C. | 85° C. | Temperature-Dependent Variation in Capacitance ΔC/C₂₅ (%) -55° C. | 125° C. | max | Product CR (MΩ·μF), at 25° C. 16 V | Product CR (MΩ·μF), at 125° C. 16 V | Mean Life Time (hr.) | Number of Test Pieces Failed in Moisture-Resistant Load Test | Grain Size (μm) |
|---|---|---|---|---|---|---|---|---|---|---|---|---|---|
| *113 | 1360 | 2650 | 2.5 | −2.4 | −1.9 | −3.1 | 1.2 | 3.5 | 4840 | 1650 | 63 | 45/72 | 0.65 |
| *114 | 1360 | | | As the sample was sintered insufficiently, the measurement was impossible | | | | | | | | | 0.61 |
| *115 | 1360 | | | As the sample was sintered insufficiently, the measurement was impossible | | | | | | | | | 0.61 |
| *116 | 1360 | 3250 | 2.0 | −1.4 | −7.2 | −2.2 | −9.0 | 9.0 | 6360 | 2230 | 398 | 72/72 | 0.71 |
| *117 | 1360 | | | As the sample was sintered insufficiently, the measurement was impossible | | | | | | | | | 0.61 |
| *118 | 1360 | | | As the sample was sintered insufficiently, the measurement was impossible | | | | | | | | | 0.61 |
| *119 | 1360 | | | As the sample was sintered insufficiently, the measurement was impossible | | | | | | | | | 0.61 |

Samples with * are outside the invention

As is obvious from Table 4 and Table 5, the monolithic capacitor samples comprising dielectric ceramic layers, to which was added an oxide of the type of $SiO_2$—$TiO_2$—MO in an amount falling within the scope of the present invention, were all found to have a high dielectric constant of not lower than 3,000, and have a dielectric loss tangent, tan δ, of not larger than 2.5%, while satisfying the B-level characteristic standard stipulated in the JIS Standard within the temperature range between −25° C. and 85° C. and also the X7R-level characteristic standard stipulated in the EIA Standard within the temperature range between −55° C. and 125° C. with respect to the temperature-dependent variation in the capacitance.

In addition, these samples of the invention were found to have high insulation resistance values when measured at 25° C. and 125° C., of not smaller than 6,000 ΩF and not smaller than 2,000 ΩF, respectively, in terms of the product CR. Further, these were found to have a long mean life time of not shorter than 300 hours, and none of these failed in the moisture-resistant load test.

Figure 4:
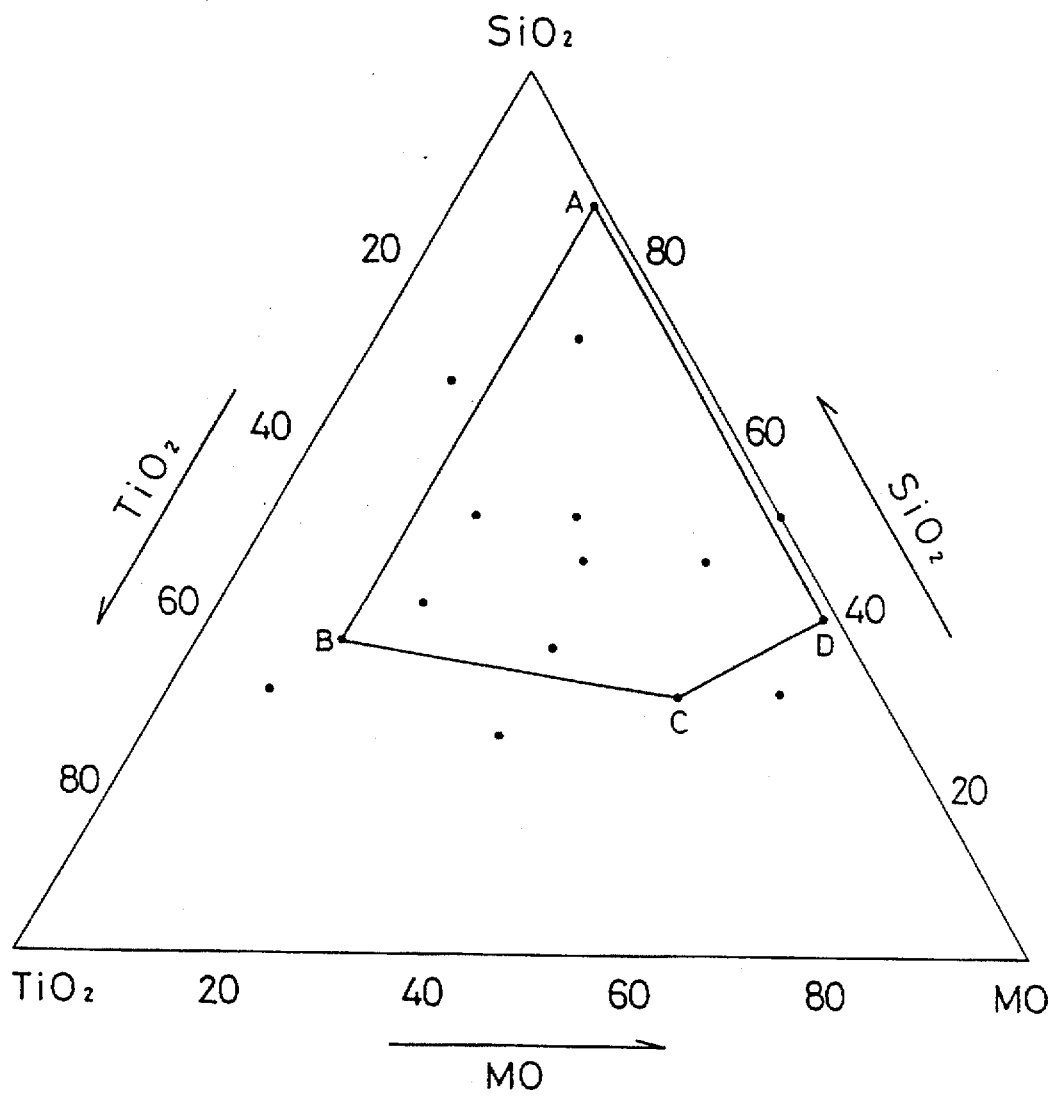
FIG. 4 is a three-component compositional graph for {$SiO_2$, $TiO_2$, MO}, which indicates the compositional range of the oxide additive of $SiO_2$—$TiO_2$—MO.

As opposed to the samples of the invention, the other samples, Sample Nos. 113 to 116 and 119 which did not fall within the scope of the invention in that the amount of the oxide of $SiO_2$—$TiO_2$—MO (where MO is an oxide selected from BaO, CaO, SrO, MgO, ZnO and MnO) added thereto is without the scope of the compositional range as defined to be surrounded by four points, A, B, C and D in a triangular diagram of {$SiO_2$, $TiO_2$, MO} shown in FIG. 4 were not good, since they could not be sintered well, or even sintered, many of these failed in the moisture-resistant load test. In FIG. 4 referring to the defined compositional range, the point A indicates a composition comprising 85 mol % of $SiO_2$, 1 mol % of $TiO_2$ and 14 mol % of MO; the point B indicates a composition comprising 35 mol % of $SiO_2$, 51 mol % of $TiO_2$ and 14 mol % of MO; the point C indicates a composition comprising 30 mol % of $SiO_2$, 20 mol % of $TiO_2$ and 50 mol % of MO; and the point D indicates a composition comprising 39 mol % of $SiO_2$, 1 mol % of $TiO_2$ and 60 mol % of MO.

As illustrated in Sample Nos. 111 and 112, monolithic capacitors having an insulation resistance of 7,000 MΩ·μF and 3,000 MΩ·μF at 25° C. and at 125° C., respectively, could be obtained when an oxide of $SiO_2$—$TiO_2$—MO and also $Al_2O_3$ and $ZrO_2$ were added thereto. As seen in Sample Nos. 117 and 118, however, if the amount of $Al_2O_3$ added was over about 15 parts by weight or if the amount of $ZrO_2$ added was over about 5 parts by weight, such is unfavorable since the sinterability of the samples is greatly lowered.

In the above-mentioned examples, used was a powder of barium titanate prepared according to the oxalic acid method, which, however, is not limitative. Apart from this, also employable are powders of barium titanate as prepared according to the alkoxide method or the hydrothermal reaction method. If the latter powders are used, the characteristics of the capacitors may often be improved more than those of the samples as demonstrated in these examples herein. Powders of terbium oxide, dysprosium oxide, holmium oxide, erbium oxide, ytterbium oxide, manganese oxide, cobalt oxide, nickel oxide and others were used in these examples, which, however, are not also limitative. Solutions of alkoxides or organic metal compounds for such oxides can also be employed, in place of such oxide powders, without interfering with the characteristics of the capacitors produced, provided that they are formulated to constitute the dielectric ceramic layers falling within the scope of the present invention.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor composed of;

a plurality of dielectric ceramic layers, a plurality of inner electrodes as formed between the dielectric ceramic layers in such a manner that one end of an inner electrode is exposed out of an end of the dielectric ceramic layers, and outer electrodes electrically connected with the exposed inner electrodes, the monolithic ceramic capacitor being characterized in that the dielectric ceramic layers each are made of a material comprising a barium titanate having an alkali metal oxide impurity of content of about 0.02% by weight or less, of the compositional formula:

$$(1-\alpha-\beta)\{BaO\}_m TiO_2 + \alpha Re_2O_3 + \beta(Mn_{1-x-y}Ni_xCo_y)O$$

where $Re_2O_3$ is one or more selected from $Tb_2O_3$, $Dy_2O_3$, $Ho_2O_3$, $Er_2O_3$ and $Yb_2O_3$; and α, β, m, x and y are as follows:

$0.0025 \leq \alpha \leq 0.025$ $0.0025 \leq \beta \leq 0.05$ $\beta/\alpha \leq 4$ $0 \leq x < 1.0$ $0 \leq y < 1.0$ $0 \leq x+y < 1.0$ $1.000 < m \leq 1.035$, magnesium oxide in an amount of from about 0.5 to 5.0 mols, in terms of MgO, relative to 100 mols of the titanate and from about 0.2 to 3.0 parts by weight, relative to 100 parts by weight of said titanate and MgO, of a $SiO_2$—$TiO_2$—MO oxide where MO is at least one oxide selected from the group consisting of BaO, CaO, SrO, MgO, ZnO and MnO; and the inner electrodes comprise nickel or a nickel alloy.

2. The monolithic ceramic capacitor as claimed in claim 1, wherein the $SiO_2$—$TiO_2$—MO oxide falls within a compositional range as surrounded by four lines formed by connecting four points, represented by mol %, of:

A (85, 1, 14)

B (35, 51, 14)

C (30, 20, 50)

D (39, 1, 60)

in a triangular diagram of $\{SiO_2, TiO_2, MO\}$ and wherein the oxide further contains a total of about 15 parts by weight or less, relative to 100 parts by weight of said other components, of at least one of $Al_2O_3$ and $ZrO_2$, provided that the $ZrO_2$ content is about 5 parts by weight or less.

3. The monolithic ceramic capacitor as claimed in claim 2, wherein the alkali metal oxide impurity content is less that about 0.015% by weight, the magnesium oxide is in an amount of from about 0.5 to 5.0 mols, $0.003 \leq \alpha 0.02$, $0.005 \leq \beta \leq 0.024$, $\beta/\alpha \leq 2$, $0.1 \leq x < 0.9$, $0.1 \leq y < 0.9$, $1.005 < m \leq 1.015$, and the $SiO_2$—$TiO_2$—MO oxide is about 1 to 2 parts by weight.

4. The monolithic ceramic capacitor as claimed in claim 3, wherein said ceramic has a grain size of less than about 1 μm.

5. The monolithic ceramic capacitor as claimed in claim 4 having two separate outer electrodes on the outside surface of the capacitor, each of which is electrically connected to an inner electrode.

6. The monolithic ceramic capacitor as claimed in claim 5, wherein the outer electrodes comprise a sintered layer of an electroconductive metal powder optionally containing a glass frit.

7. The monolithic ceramic capacitor as claimed in claim 6, wherein the outer electrodes are composed of a first sintered layer of an electroconductive metal powder optionally containing a glass frit added thereto, and a second plated layer formed on the first layer.

8. The monolithic ceramic capacitor as claimed in claim 3 having two separate outer electrodes on the outside surface of the capacitor, each of which is electrically connected to an inner electrode.

9. The monolithic ceramic capacitor as claimed in claim 8, wherein the outer electrodes comprise a sintered layer of an electroconductive metal powder optionally containing a glass frit.

10. The monolithic ceramic capacitor as claimed in claim 9, wherein the outer electrodes are composed of a first sintered layer of an electroconductive metal powder optionally containing a glass frit added thereto, and a second plated layer formed on the first layer.

11. The monolithic ceramic capacitor as claimed in claim 2 having two separate outer electrodes on the outside surface of the capacitor, each of which is electrically connected to an inner electrode.

12. The monolithic ceramic capacitor as claimed in claim 11, wherein the outer electrodes comprise a sintered layer of an electroconductive metal powder optionally containing a glass frit.

13. The monolithic ceramic capacitor as claimed in claim 12, wherein the outer electrodes are composed of a first sintered layer of an electroconductive metal powder optionally containing a glass frit added thereto, and a second plated layer formed on the first layer.

14. The monolithic ceramic capacitor as claimed in claim 1 having two separate outer electrodes on the outside surface of the capacitor, each of which is electrically connected to an inner electrode.

15. The monolithic ceramic capacitor as claimed in claim 14, wherein the outer electrodes comprise a sintered layer of an electroconductive metal powder optionally containing a glass frit.

16. The monolithic ceramic capacitor as claimed in claim 15, wherein the outer electrodes are composed of a first sintered layer of an electroconductive metal powder optionally containing a glass frit added thereto, and a second plated layer formed on the first layer.

\* \* \* \* \*